US012619547B2

(12) United States Patent
Du

(10) Patent No.: US 12,619,547 B2
(45) Date of Patent: May 5, 2026

(54) SSD DEVICE ACCELERATED BY DYNAMIC CAPACITY CACHE

(71) Applicant: INNOGRIT TECHNOLOGIES CO., LTD., Shanghai (CN)

(72) Inventor: Song Du, Shanghai (CN)

(73) Assignee: INNOGRIT TECHNOLOGIES CO., LTD., Shanghai (CN)

( * ) Notice: Subject to any disclaimer, the term of this patent is extended or adjusted under 35 U.S.C. 154(b) by 0 days.

(21) Appl. No.: 18/535,920

(22) Filed: Dec. 11, 2023

(65) Prior Publication Data

US 2024/0202126 A1    Jun. 20, 2024

(30) Foreign Application Priority Data

Dec. 16, 2022    (CN) .......................... 202211627624.7

(51) Int. Cl.
*G06F 12/0871* (2016.01)
*G06F 12/0804* (2016.01)

(52) U.S. Cl.
CPC ...... *G06F 12/0871* (2013.01); *G06F 12/0804* (2013.01)

(58) Field of Classification Search
CPC .......................... G06F 12/0871; G06F 12/0804
See application file for complete search history.

(56) References Cited

U.S. PATENT DOCUMENTS

| | | | | |
|---|---|---|---|---|
| 9,984,004 B1 * | 5/2018 | Little | .................. | G06F 12/0811 |
| 2009/0172315 A1 * | 7/2009 | Iyer | ........................ | G06F 12/126 |
| | | | | 711/158 |
| 2015/0256639 A1 * | 9/2015 | Chow | .................. | H04L 67/535 |
| | | | | 709/213 |
| 2018/0300238 A1 * | 10/2018 | Vembu | ................ | G06F 12/0646 |

\* cited by examiner

*Primary Examiner* — Prasith Thammavong
(74) *Attorney, Agent, or Firm* — HSML P.C.

(57) ABSTRACT

This application relates to the field of SSD and discloses an SSD device accelerated by dynamic capacity cache. The device includes: a memory comprising multiple storage subspaces; a buffer comprising multiple cache subspaces, each corresponding one-to-one with the storage subspaces; a cache executor configured to allocate a corresponding cache unit for a storage unit based on a necessary capacity, a read peak capacity, and a write peak capacity of the cache subspace corresponding to the storage subspace to which the storage unit belongs when reading out or writing into the storage unit, and send allocation information of the cache unit to a cache allocator; and the cache allocator configured to set a total capacity of the corresponding cache subspace for at least one storage subspace based on an external cache configuration request, as well as initial values of the necessary capacity, the read peak capacity, and the write peak capacity, and adjust the necessary capacity, the read peak capacity, and the write peak capacity of the cache subspace based on the total capacity of the cache subspace and the allocation information provided by the cache executor. This application configures and changes the cache subspace without resetting the device.

12 Claims, 1 Drawing Sheet

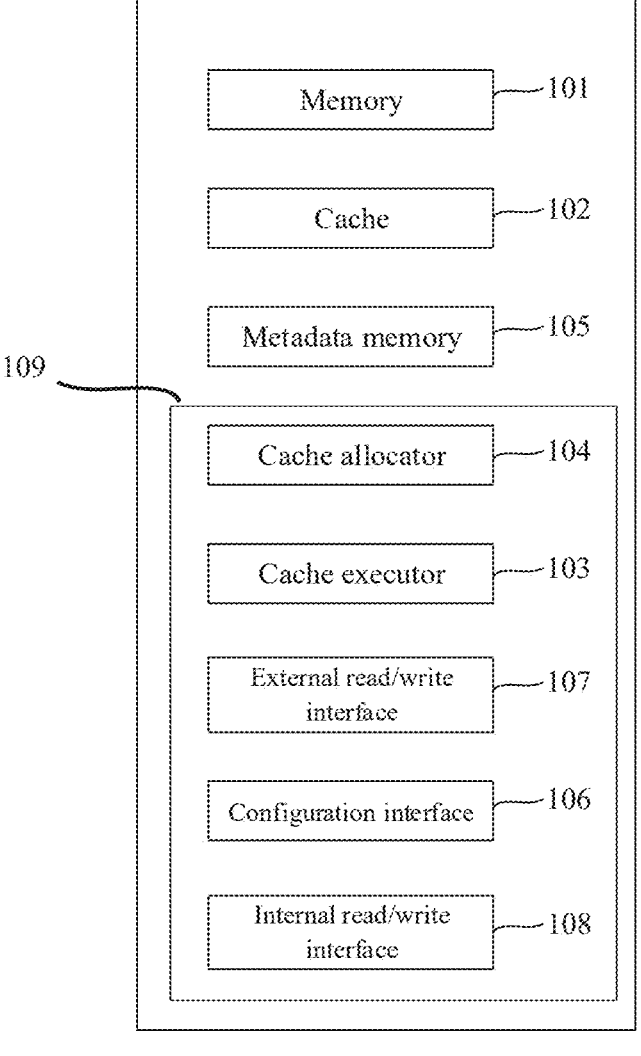

SSD DEVICE ACCELERATED BY DYNAMIC CAPACITY CACHE

CROSS-REFERENCE TO PRIOR APPLICATION

This application claims priority to Chinese Application number CN202211627624.7 which is filed on Dec. 16, 2022, the contents of which are incorporated herein by reference.

TECHNICAL FIELD

This application relates to the technology field of SSD, particularly to an SSD device accelerated by dynamic capacity cache.

BACKGROUND

Storage device (or SSD) divides all storage units into several storage subspaces according to external requests. Existing storage device provides high-speed read and write caching for the storage subspaces within the device. In order to accelerate the read and write bandwidth of the content in the storage unit and reduce the read and write latency, the storage device configures a certain number of in-device cache units for a certain number of storage units. The number of storage units belonging to the storage subspace and the corresponding number of cache units are fixed or unconfigurable at runtime. Unless the device is reset (without the need for resetting the device), the number of corresponding cache units cannot be changed in response to the external request which can improve the average cache hit rate for the storage subspace. Due to the limitation, a device that can dynamically allocate storage subspace capacity based on the external request at runtime cannot simultaneously provide an optional average cache hit rate for the storage subspace.

On this basis, existing operating systems use system memory to provide high-speed read and write caching for the storage subspace outside of the device. When the operating system is running, the correspondence between the cache units and all accessed storage units within the device can be adjusted. Compared to inside device cache adjustment, this method consumes additional computing and memory resources outside the device, and cannot configure different numbers of cache units for different storage subspaces according to the external requests without resetting the system.

This section aims to provide background or context for the implementation of the application stated in the claims. The description here should not be considered prior art merely because it is included in this section.

SUMMARY OF THE INVENTION

An object of this application is to provide an SSD device accelerated by dynamic capacity cache, which can configure and change the number of cache units to which the cache subspace belongs without resetting the device.

The application discloses an SSD device accelerated by dynamic capacity cache, comprising:
- a memory comprising multiple storage subspaces;
- a cache comprising multiple cache subspaces, each corresponding one-to-one with the storage subspaces;
- a cache executor, configured to allocate corresponding cache unit(s) for a storage unit based on a necessary capacity, a read peak capacity, and a write peak capacity of the cache subspace corresponding to the storage subspace to which the storage unit belongs when reading out or writing into the storage unit, and send allocation information of the cache unit(s) to a cache allocator; and
- the cache allocator, configured to set a total capacity of the corresponding cache subspace for at least one storage subspace based on an external cache configuration request, as well as initial values of the necessary capacity, the read peak capacity, and the write peak capacity, and adjust the necessary capacity, the read peak capacity, and the write peak capacity of the cache subspace based on the total capacity of the cache subspace and the allocation information provided by the cache executor.

In one embodiment, further comprises a metadata memory which stores:
- structured metadata for the storage subspaces used to record metadata of each storage subspace, wherein the metadata of each storage subspace comprises an index of storage unit within each storage subspace;
- structured metadata for the cache subspaces used to record metadata of each cache subspace, wherein the metadata of each cache subspace comprises requirement metadata, execution metadata, and structured data for search cost;
- structured metadata for the storage units used to record metadata of each storage unit, wherein the metadata of each storage unit comprises an index of the cache unit(s) corresponding to the storage unit and an index of the storage subspace to which the storage unit belongs; and
- structured metadata for the cache units used to record metadata of each cache unit, wherein the metadata of each cache unit comprises an index of the storage unit corresponding to the cache unit, an index of the cache subspace to which the cache unit belongs, and structured data for cache states.

In one embodiment, the cache allocator is further configured to:
- read the metadata of all cache subspaces from the structured metadata for the cache subspaces, and calculate the total capacity of the cache subspace based on a configuration request of cache capacity of the cache subspace corresponding to the storage subspace;
- based on the configuration request of a cache adjustment policy option of the cache subspace, allocate the necessary capacity, the read peak capacity, and the write peak capacity from the total capacity of the cache subspace, and determine a search range and a cache execution policy option; and
- record the configuration request of the cache capacity, the configuration request of the cache adjustment policy option, the total capacity, the necessary capacity, the read peak capacity, the write peak capacity, the search range, and the cache execution policy option of the cache subspace into the requirement metadata of the cache subspace.

In one embodiment, the cache allocator is further configured to:
- suspend operations of all storage units of the storage subspace and all cache units in the cache subspace corresponding to the storage subspace;
- configure a corresponding cache subspace for the storage subspace and adjust the requirement metadata of the corresponding cache subspace;
- restore operations involving the storage subspace and corresponding cache subspace initiated by the cache executor within a selected adjustment time based on the adjusted requirement metadata and the execution metadata of the corresponding cache subspace;

after the selected adjustment time is reached, adjust the requirement metadata of other cache subspaces based on the configuration request of the cache adjustment policy option; and restore operations of all storage units of the storage subspace and all cache units in the cache subspace corresponding to the storage subspace.

In one embodiment, the cache executor is further configured to:

read the metadata of the storage unit, if there is a corresponding cache unit, select the cache unit and update the structured data for cache states of the cache unit, and update the execution metadata and the structured data for search cost of the cache subspace to which the cache unit belongs;

if no corresponding cache unit exists, read the requirement metadata and the execution metadata of the cache subspace to which the cache unit belongs, and calculate the search range, a search order, and a search end condition;

in the cache units, within the search range, calculate search cost function for each candidate cache unit according to the search order and record them into the structured data for search cost of the cache subspace to which the cache unit belongs before reaching the search end condition;

select the cache unit with the minimum search cost function, and update the metadata of the storage unit, the metadata of the original storage unit corresponding to the cache unit, and the metadata of the cache unit; and return the structured data for search cost of the cache subspace, to which the cache unit belongs, to the cache allocator.

In one embodiment, the cache executor is further configured to:

read the requirement metadata and the execution metadata of the cache subspace to which the cache unit belongs, and calculate the search range, a search order, and a search end condition;

in the cache units, within the search range, calculate search cost function for each candidate cache unit according to the search order and record them into the structured data for search cost of the cache subspace to which the cache unit belongs before reaching the search end condition;

select the cache unit with the minimum search cost function, and update the metadata of original storage unit corresponding to the cache unit, and the metadata of the cache unit; and return the structured data for search cost of the cache subspace, to which the cache unit belongs, to the cache allocator.

In one embodiment, the device further comprises:

a cache configuration interface configured to receive the external cache configuration request including a cache capacity and a cache adjustment policy option;

an external read/write interface configured to respond to external read/write requests, read out all or part of the content of the corresponding storage unit, or write all or part of the content received by the external read/write interface into the corresponding storage unit; and an internal read/write interface configured to implement read and write between the cache units and the storage units.

In one embodiment, the cache executor is further configured to:

search for and select a cache unit for the specified storage unit in an external read request;

if the structured data for cache states of the cache unit indicates inconsistency between its content and that of the storage unit, then hand over the cache unit to the internal read/write interface, sequentially read out the content of the storage unit and write it into the cache unit, and update the structured data for cache states of the cache unit and the execution metadata of the cache subspace to which it belongs; and deliver specified part or all of the content in the external read request to the external read/write interface.

In one embodiment, the cache executor is further configured to:

search for and select a cache unit for the specified storage unit in an external write request;

if the external write request writes only part of the storage unit, then based on the structured data for cache states of the cache unit, determine whether or not to hand over the cache unit to the internal read/write interface, sequentially read out the content of the storage unit and write it into the cache unit, and update the structured data for cache states of the cache unit and the execution metadata of the cache subspace to which it belongs;

obtain some part of new content of the storage unit from the internal read/write interface, write it into the cache unit, and update the structured data for cache states of the cache unit and the execution metadata of the cache subspace to which it belongs; and deliver specified part or all of the content in the external write request to the external read/write interface.

In one embodiment, the cache executor is further configured to:

traverse the structured metadata for the storage units, and search for the storage unit, wherein search criteria comprises: the storage unit does not have a corresponding cache unit;

for each found storage unit, based on the requirement metadata and the execution metadata of corresponding cache subspace of the storage unit, and based on the cache execution policy option of the cache subspace, determine to search for and select a cache unit for the storage unit; and hand over the cache unit to the internal read/write interface, sequentially read out the content of the storage unit and write it into the cache unit, and update the structured data for cache states of the cache unit and the execution metadata of the cache subspace to which it belongs.

In one embodiment, the cache executor is further configured to:

traverse the structured metadata for the cache units, search for the cache unit, wherein search criteria comprises: the content of the cache unit is inconsistent with the content of its corresponding storage unit; and for each found cache unit, based on the requirement metadata and the execution metadata of the cache subspace to which the cache unit belongs, and based on the cache execution policy option of the cache subspace, determine to search and execute a) or b) for the storage unit, wherein:

a) hand over the first cache unit to the internal read/write interface, sequentially write it into the storage unit, and update the structured data for cache states of the cache unit and the execution metadata of the cache subspace to which it belongs; and after the internal read/write interface completes the writing, update the structured data for cache states of the cache unit and the execution metadata of the cache subspace to which it belongs;

b) search for and select a second cache unit for the cache unit;

write the content of the cache unit into the second cache unit, and update the structured data for cache states of the cache unit and the execution metadata of the cache subspace to which it belongs;

hand over the second cache unit to the internal read/write interface, sequentially write it into the storage unit, and update the structured data for cache states of the cache unit and the execution metadata of the cache subspace to which it belongs; and after the storage read/write interface completes the writing, update the structured data for cache states of the cache unit and the execution metadata of the cache subspace to which it belongs.

In one embodiment, the cache executor is further configured to:

traverse the structured metadata for the cache units, search for the cache unit, wherein search criteria comprises: the location of the cache unit in the structured metadata for the cache units does not meet the requirement of the search range in the requirement metadata of the cache subspace;

for each found cache unit, based on the requirement metadata and the execution metadata of the cache subspace to which the cache unit belongs, and based on the cache execution policy option of the cache subspace, determine to search for and select a second cache unit for the storage unit;

write the content of the cache unit into the second cache unit, and update the structured data for cache states of the cache unit and the second cache unit and the execution metadata of the cache subspaces to which they belong; and update the metadata of the storage unit corresponding to the cache unit.

In the embodiments of the present application, an SSD device accelerated by dynamic capacity cache inside the device is provided. For the storage subspaces within the device, the number of cache units corresponding to each storage subspace can be configured based on the external request received by the device without resetting the device. To achieve this, each storage subspace will be equipped with a cache subspace that shares the cache units within the device. The number of the cache units belonging to the cache subspace can be configured and changed without resetting the system. When the configured quantity changes, new content that is stored in the cache unit but not in the storage unit will not be discarded. As the configured quantity increases, the number of cache units used for this storage subspace will gradually increase until the configured quantity is reached. As the configuration quantity decreases, the number of cache units used for this storage space will gradually decrease until the configured quantity is reached.

The various technical features disclosed in the above summary of the present application, the technical features disclosed in the various embodiments and examples below, and the various technical features disclosed in the drawings can be freely combined with each other to constitute various new technical solutions (all of which are considered to have been described in this specification), unless a combination of such technical features is not technically feasible. For example, feature A+B+C is disclosed in one example, and feature A+B+D+E is disclosed in another example, while features C and D are equivalent technical means that perform the same function, and technically only choose one, not to adopt at the same time. Feature E can be combined with feature C technically. Then, the A+B+C+D scheme should not be regarded as already recorded because of the technical infeasibility, and A+B+C+E scheme should be considered as already documented.

BRIEF DESCRIPTION OF THE FIGURES

FIG. 1 is a schematic block diagram of an SSD device accelerated by dynamic capacity cache according to an embodiment of the present application.

DETAILED DESCRIPTION

In the following description, numerous technical details are set forth in order to provide the readers with a better understanding of the present application. However, those skilled in the art can understand that the technical solutions claimed in the present application can be implemented without these technical details and various changes and modifications based on the following embodiments.

In order to make the objects, technical solutions and advantages of the present application clearer, embodiments of the present application will be further described in detail below with reference to the accompanying drawings.

An embodiment of this application relates to an SSD device accelerated by dynamic capacity cache, the structure of which is shown in FIG. 1. The SSD device includes a memory 101, a cache 102, and a controller 109 that includes, at least, a cache executor 103 and a cache allocator 104. The memory 101 is configured to contain multiple storage subspaces. The cache 102 is configured to contain multiple cache subspaces, and there is one-to-one correspondence between the cache subspaces and the storage subspaces. Specifically, all storage units in the SSD device are divided into several storage subspaces, and each storage subspace contains several storage units. The capacity of the storage subspace is expressed as the number of storage units belonging to it. All cache units in the SSD device are divided into several cache subspaces, and each cache subspace contains several cache units. The capacity of the cache subspace is expressed as the number of cache units belonging to it. Each storage subspace corresponds to one cache subspace. Each storage unit corresponds to one cache subspace. Each storage unit corresponds to zero unit, one unit, or multiple cache units. Each cache unit corresponds to one storage unit.

The cache executor 103 is configured to allocate corresponding cache unit(s) to the storage unit based on the necessary capacity, the read peak capacity, and the write peak capacity of the cache subspace corresponding to the storage unit when reading and writing the storage unit, and send the allocation information of the cache unit(s) to the cache allocator 104. The cache allocator 104 is configured to set the total capacity of the cache subspace corresponding to at least one storage subspace based on the external cache configuration request, as well as the initial values of the necessary capacity, the read peak capacity, and the write peak capacity, and adjust the necessary capacity, the read peak capacity, and the write peak capacity of the cache subspace based on the total capacity of the cache subspace and the allocation information provided by the cache executor 103.

In one embodiment, the SSD device further comprises a metadata memory 105, which stores:

i) structured metadata for the storage subspaces. The structured metadata records the metadata of each storage subspace. The metadata of each storage subspace records the index of the storage unit belonging to the subspace.

ii) structured metadata for the cache subspaces. The structured metadata records the metadata of each cache subspace. The metadata of each cache subspace records the followings: requirement metadata, execution metadata, and structured data for search cost. In particular, the requirement metadata comprises various capacities and various boundaries, and the use of boundaries enables the segmentation of the various subspaces in a unified total space to facilitate fast querying, as well as to facilitate the definition of interleaving. The execution metadata comprises SUM of various units in various states (for comparison with required capacity); and various execution boundaries (for comparison with required boundaries). Because it needs to be written frequently. A slight lag during reading does not hinder, so special locks are needed to ensure strong bandwidth. The structured data for search cost is the short-term history of search costs.

iii) structured metadata for the storage units. The structured metadata records the metadata of each storage unit. The metadata of each storage unit records the index of the cache unit corresponding to this storage unit and the index of the storage subspace to which this storage unit belongs.

iv) structured metadata for the cache units. The structured metadata records the metadata of each cache unit. The metadata of each cache unit records the index of the storage unit corresponding to this cache unit, the index of the cache subspace to which this cache unit belongs, and the structured data for cache states of this cache unit.

The SSD device also comprises an external read/write interface 107 that connects inside and outside the SSD. This interface 107 responds to a request initiated by an external initiator, initiates a read request for the content of a storage unit inward, and feeds part or all of the content of this unit that arrives at the interface back to the external request initiator; or, responds to a request initiated by the external initiator, initiates a write request for the content of a storage unit inward, and writes part or all of the content delivered externally to the read/write interface into this unit, and feeds the result back to the external request initiator.

The SSD device also comprises a configuration interface 106 that connects inside and outside the SSD. This interface 106 responds to a request initiated by the external initiator to configure a new cache subspace for a storage subspace; or, responds to a request initiated by the external initiator to change the configuration of an existing cache subspace for a storage subspace. The configuration request for the cache subspace comprises cache capacity and cache adjustment policy option.

The SSD device also comprises an internal read/write interface 108 that connects to an internal storage reader (not shown in the FIGURE). The interface 108 writes the content of a cache unit into a storage unit and feeds back the execution result; or reads the content of a storage unit, writes it into a cache unit and feeds back the execution result.

The cache allocator 104 can configure a corresponding cache subspace for a storage subspace, configure a new cache subspace for a storage subspace, change the configuration of an existing cache subspace for a storage subspace, and adjust the content of the requirement metadata for a cache subspace.

It should be noted that configuring a new cache subspace for a storage subspace refers to configuring an inactive cache subspace that has not been allocated cache unit(s) to be an active cache subspace that has been allocated cache unit(s). Changing the configuration of an existing cache subspace for a storage subspace refers to changing the configuration of a working cache subspace that has already been allocated cache unit(s) to a new number of cache units and a new cache policy of cache subspace.

The cache executor 103 can sequentially execute a total sequence composed of the following action sequences:

(1) an action sequence that responds to a storage content read request initiated by the external read/write interface.

(2) an action sequence that responds to a storage content write request initiated by the external read/write interface.

(3) an action sequence of a self-initiated storage content read request.

(4) an action sequence of a self-initiated storage content write request.

(5) an action sequence that notifies the internal read/write interface connected the storage reader to read the content of a storage unit and write it into a cache unit.

(6) an action sequence that notifies the internal read/write interface connected the storage reader to write the content of a cache unit into a storage unit.

(7) an action sequence that searches and selects a cache unit for a storage unit.

(8) an action sequence that searches and selects a new cache unit for a cache unit.

(9) an action sequence that reads or changes the metadata of a cache subspace.

(10) an action sequence that reads or changes the metadata of a cache unit.

(11) an action sequence that reads or changes the metadata of a storage unit.

(12) an action sequence that writes the content of one cache unit into another cache unit.

In order to better understand the technical solution of this application, the above functions and action sequences of the cache allocator and the cache executor will be explained in detail below.

The cache allocator 104 configures a corresponding cache subspace for a storage subspace, comprising the following steps:

(1) reading the metadata of all cache subspaces recorded in the structured metadata for the cache subspaces, and calculating the total capacity of the cache subspace based on its cache capacity request.

(2) according to the cache adjustment policy option request, allocating the necessary capacity, the read peak capacity, and the write peak capacity from the total capacity of the cache subspace, and determining the search range and the cache execution policy option.

(3) recording the cache capacity request, the cache adjustment policy option, the total capacity, the necessary capacity, the read peak capacity, the write peak capacity, the search range, and the cache execution policy option in the requirement metadata of the cache subspace.

(4) feeding the configuration result back to the configuration interface.

The cache allocator 104 configures a new cache subspace for a storage subspace, including the following steps:

(1) allocating a cache subspace for the storage subspace and record it in the metadata of the storage subspaces and the metadata of the cache subspaces.

(2) configuring the cache subspace corresponding to the storage subspace.

The cache allocator 104 changes the configuration of an existing cache subspace for a storage subspace, comprising the following steps:

(1) suspending the actions of all storage units and all cache units to which the storage subspace and corresponding cache subspace belong.

(2) according to the configuration of the new cache subspace, configuring the corresponding cache subspace for the storage subspace.

(3) based on the adjusted requirement metadata of the cache subspace, the existing execution metadata in the cache subspace, and the adjusted cache execution policy option, within the adjustment time selected by the cache execution policy option, restoring the actions initiated by the cache executor involving the storage subspace and the cache subspace.

(4) after the adjustment time is reached, adjusting the requirement metadata of other cache subspaces according to the cache adjustment policy option request.

(5) restoring the action involving all storage units and all cache units belonging to the storage subspace and corresponding cache subspace.

The cache allocator 104 adjusts the content of the requirement metadata of a cache subspace, comprising the following steps:

(1) receiving the update fed back from the cache executor of the structured data for search cost of a cache subspace, (2) adjusting the content in the requirement metadata of the cache subspace based on the cache adjustment policy option.

The cache executor 103 searches and selects a cache unit for a storage unit, comprising the following steps:

(1) reading the metadata of the storage unit, if the corresponding cache unit is found in it, selecting the cache unit and updating the structured data for cache states of the cache unit, and updating the execution metadata and the structured data for search cost of the cache subspace to which the cache unit belongs, and returning; if not found, continuing with the following actions:

(2) reading the cache requirement metadata and the execution metadata of the cache subspace corresponding to the storage unit, calculating the search range, the search order, and the search end condition.

(3) in the content of the structured metadata for the cache units, within the search range, calculating the cost function for each candidate cache unit according to the search order before reaching the search end condition, and recording each result in the structured data for search cost of this cache subspace. The input of the cost function is the requirement metadata and the execution metadata of the cache subspace corresponding to the storage unit, as well as the metadata of the candidate cache unit. The output is a comparable numerical value.

(4) among all the found candidate cache units, selecting the one with the lowest cost.

(5) changing the content of the metadata of the storage unit and storing the index of the selected cache unit.

(6) reading the content of the selected cache unit metadata, and if there is a storage unit corresponding to it, invalidating the corresponding cache unit record in the metadata of the storage unit.

(7) changing the content of the selected cache unit metadata, storing the index of the storage unit, and updating the structured data for cache states.

(8) feeding the structured data for search cost of the cache subspace to which the cache unit belongs back to the cache allocator 104.

The cache executor 103 searches and selects a new cache unit for a cache unit, comprising the following steps:

(1) reading the cache requirement metadata and the execution metadata of the cache subspace to which this target cache unit belongs, calculating the search range, the search order, and the search end condition.

(2) in the content of the structured metadata for the cache units, within the search range, calculating the cost function results for each candidate cache unit according to the search order before reaching the search end condition, and recording each result in the structured data for search cost of this cache subspace. The search range excludes the cache unit itself.

(3) the input of the cost function is the requirement metadata and the execution metadata of the cache subspace corresponding to this storage unit, as well as the metadata of the candidate cache unit. The output is a comparable numerical value.

(4) among all the found candidate cache units, selecting the one with the lowest cost.

(5) reading the content of the selected cache unit metadata, and if there is a storage unit corresponding to it, invalidating the corresponding cache unit record in the metadata of this storage unit.

(6) changing the content of the selected cache unit metadata, storing the index of this storage unit, and updating the structured data for cache states.

(7) feeding the structured data for search cost of the cache subspace to which the target cache unit belongs back to the cache allocator 104.

In response to the storage content read request initiated by the external read/write interface 107, the cache executor 103 performs the following steps:

(1) searching for and selecting a cache unit for the storage unit specified in the request.

(2) if the structured data for cache states of the cache unit indicates inconsistency between its content and that of the storage unit, handing over the cache unit to the internal read/write interface 108 of the storage reader, sequentially reading out the content of the storage unit and writing it into the cache unit, and changing the structured data for cache states content of the cache unit and the execution metadata of the cache subspace to which it belongs.

(3) delivering part or all of the specified content in the request to the read/write interface and notifying the read/write interface to complete the request.

In response to the storage content write request initiated by the external read/write interface 107, the cache executor 103 performs the following steps:

(1) searching for and selecting a cache unit for the storage unit specified in the request.

(2) if the write request writes only part of the content of the storage unit, then based on the structured data for cache states content of the cache unit, determining whether to perform the following actions:

(2.1) handing over the cache unit to the internal read/write interface 108 of the storage reader, sequentially reading out the content of the storage unit, writing it into the cache unit, and changing the structured data for cache states content of the cache unit and the execution metadata content of the cache subspace to which it belongs.

(3) after the previous step is completed, obtaining new content of the storage unit from the read/write interface 107, writing it into the cache unit, and changing the structured data for cache states content of the cache unit and the execution metadata content of the cache subspace to which it belongs.

(4) notifying the read/write interface 107 to complete the request.

From the storage content read request initiated by the cache executor 103, the cache executor 103 continuously and spontaneously performs the following sequence of actions:

(1) traversing the content of the structured metadata for the storage units and searching for the storage unit. If the eligible storage unit is not found in one traversal, re-traversing after a pause. Wherein, the search condition comprises: the storage unit does not have a corresponding cache unit.

(2) For each found storage unit, based on the requirement metadata and the execution metadata of the corresponding cache subspace of this storage unit, and based on the cache execution policy option of this cache subspace, determining whether to perform the following actions:

(2.1) searching for and selecting a cache unit for this storage unit.

(2.2) handing over the cache unit to the internal read/write interface 108 of the storage reader, sequentially reading out the content of the storage unit, and writing it into the cache unit, and changing the structured data for cache states content of this cache unit and the execution metadata content of the cache subspace to which it belongs.

(3) The above actions, along with the actions initiated in response to the request of the read/write interface 107, are simultaneously scheduled into an ordered sequence of actions by the cache executor and executed sequentially.

From the storage content write request initiated by the cache executor 103, the cache executor 103 continuously and spontaneously performs the following sequence of actions:

(1) traversing the content of the structured metadata for the cache units and searching for the cache unit. If the eligible storage unit is not found in one traversal, re-traversing after a pause. Wherein, the search condition comprises: the content of the cache unit is inconsistent with the content of its corresponding storage unit;

(2) for each found cache unit, based on the requirement metadata and the execution metadata of the cache subspace corresponding to this storage unit, and based on the cache execution policy option of this cache subspace, determining whether to perform one of the following two groups of actions:

(2.1) group 1:

(2.1.1) handing over the first cache unit to the internal read/write interface 108 of the storage reader, sequentially writing it into the storage unit, and changing the content of the structured data for cache states of the cache unit and the execution metadata of the corresponding cache subspace.

(2.1.2) after the storage read/write interface completes the writing, changing the content of the structured data for cache states of the cache unit and the execution metadata of the corresponding cache subspace.

(2.2) group II:

(2.2.1) searching for and selecting the second cache unit for the cache unit.

(2.2.2) writing the content of this first cache unit to the second cache unit, and changing the content of the structured data for cache states of the cache unit and the execution metadata of the corresponding cache subspace.

(2.2.3) handing over the second cache unit to the internal read/write interface 108 of the storage reader, sequentially writing it into the storage unit, and changing the content of the structured data for cache states of the cache unit and the execution metadata of the cache subspace to which it belongs.

(2.2.4) after the storage read/write interface completes the writing, changing the content of the structured data for cache states of the cache unit and the execution metadata of the corresponding cache subspace.

(3) The above actions, along with the actions initiated in response to the request of the read/write interface 107*t*, are simultaneously scheduled into an ordered sequence of actions by the cache executor and executed sequentially.

From the cache content replication request initiated by the cache executor 103, the cache executor 103 continuously and spontaneously performs the following sequence of actions:

(1) traversing the content in the structured metadata of the cache unit and searching for the cache unit. If the eligible storage unit is not found in one traversal, re-traversing after a pause. Wherein, the search condition includes: the location of the cache unit in the structured metadata for the cache units does not meet the request of the search range in the requirement metadata of the cache subspace;

(2) for each found cache unit, based on the requirement metadata and the execution metadata of the cache subspace corresponding to this storage unit, and based on the cache execution policy option of this cache subspace, determining whether to perform the following actions:

(2.1) searching for and selecting the second cache unit for the cache unit.

(2.2) writing the contents of this first cache unit to the second cache unit, and changing the content of the structured data for cache states of the two cache units and the execution metadata of the corresponding cache subspace.

(2.3) changing the content of the metadata of the storage unit corresponding to the first cache unit.

(3) The above actions, along with the actions initiated in response to the request of the read/write interface 107, are simultaneously scheduled into an ordered sequence of actions by the cache executor and executed sequentially.

The above sequence of the actions of the cache executor is to be sorted by the action scheduler (not shown in the FIGURE) within the cache executor. That is to say, there is a natural order in which these actions are initiated, but when executing these actions, instead of the natural order, a performance-optimized execution order has to be calculated according to the consistency of the contents of the storage units involved in these actions with respect to the cache units and the resource competition (locking) relationship between the actions themselves. They are then executed in this order of execution.

Furthermore, the term "comprises" or "comprising" or "includes" or any other variations thereof is intended to encompass a non-exclusive inclusion, such that a process, method, article, or device that comprises multiple elements includes not only those elements but also other elements, or elements that are inherent to such a process, method, item, or device. Without more restrictions, the element defined by the phrase "comprise(s) a/an" does not exclude that there are other identical elements in the process, method, item or device that includes the element. In the application, if it is mentioned that an action is performed according to an element, it means the meaning of performing the action at least according to the element, and includes two cases: the behavior is performed only on the basis of the element, and the behavior is performed based on the element and other elements. Multiple, repeatedly, various, etc., expressions include 2, twice, 2 types, and 2 or more, twice or more, and 2 types or more types.

The sequence numbers used in describing the steps of the method do not in themselves constitute any limitation on the order of those steps. For example, it is not necessary that the step with the larger sequence number be performed after the step with the smaller sequence number, but it is also possible that the step with the larger sequence number be performed before the step with the smaller sequence number, and it is also possible that the steps be performed in parallel, as long as this order of performance is reasonable for a person skilled in the art. As another example, having a plurality of steps with consecutively numbered sequential numbers does not limit the number of other steps that can be executed between them.

All documents mentioned in this specification are considered to be included in the disclosure of this application as a whole, so that they can be used as a basis for modification when necessary. In addition, it should be understood that the above descriptions are only preferred embodiments of this specification, and are not intended to limit the protection scope of this specification. Any modification, equivalent replacement, improvement, etc. made within the spirit and principle of one or more embodiments of this specification should be included in the protection scope of one or more embodiments of this specification.

In some cases, the actions or steps described in the claims can be performed in a different order than in the embodiments and still achieve desired results. In addition, the processes depicted in the drawings do not necessarily require the specific order or sequential order shown in order to achieve the desired results. In some embodiments, multitasking and parallel processing are also possible or may be advantageous.

What is claimed is:

1. An SSD device accelerated by dynamic capacity cache, comprising:
    a memory comprising multiple storage subspaces;
    a cache comprising multiple cache subspaces, each corresponding one-to-one with the storage subspaces; and
    wherein the SSD device is configured to:
        allocate at least one corresponding cache unit for a storage unit based on a necessary capacity, a read peak capacity, and a write peak capacity of a corresponding one of the cache subspaces corresponding to the storage subspace to which the storage unit belongs when reading out or writing into the storage unit;
        set a total capacity of the corresponding one of the cache subspaces for at least one storage subspace based on an external cache configuration request, initial values of the necessary capacity, the read peak capacity, and the write peak capacity; and
        adjust the necessary capacity, the read peak capacity, and the write peak capacity of the cache subspace based on the total capacity of the at least one cache subspace and allocation information of the at least one cache unit.

2. The SSD device accelerated by dynamic capacity cache of claim 1, further comprising a metadata memory which stores:
    structured metadata for the storage subspaces used to record metadata of each storage subspace, wherein the metadata of each storage subspace comprises an index of storage unit within each storage subspace;
    structured metadata for the cache subspaces used to record metadata of each cache subspace, wherein the metadata of each cache subspace comprises requirement metadata, execution metadata, and structured data for search cost;
    structured metadata for the storage units used to record metadata of each storage unit, wherein the metadata of each storage unit comprises an index of the cache unit(s) corresponding to the storage unit and an index of the storage subspace to which the storage unit belongs; and
    structured metadata for the cache units used to record metadata of each cache unit, wherein the metadata of each cache unit comprises an index of the storage unit corresponding to the cache unit, an index of the cache subspace to which the cache unit belongs, and structured data for cache states.

3. The SSD device accelerated by dynamic capacity cache of claim 2, wherein the SSD device is further configured to:
    read the metadata of all cache subspaces from the structured metadata for the cache subspaces, and calculate the total capacity of the cache subspace based on a configuration request of cache capacity of the cache subspace corresponding to the storage subspace;
    based on the configuration request of a cache adjustment policy option of the cache subspace, allocate the necessary capacity, the read peak capacity, and the write peak capacity from the total capacity of the cache subspace, and determine a search range and a cache execution policy option; and
    record the configuration request of the cache capacity, the configuration request of the cache adjustment policy option, the total capacity, the necessary capacity, the read peak capacity, the write peak capacity, the search range, and the cache execution policy option of the cache subspace into the requirement metadata of the cache subspace.

4. The SSD device accelerated by dynamic capacity cache of claim 2, wherein the SSD device is further configured to:
    suspend operations of all storage units of the storage subspace and all cache units in the cache subspace corresponding to the storage subspace;
    configure a corresponding cache subspace for the storage subspace and adjust the requirement metadata of the corresponding cache subspace;

restore operations involving the storage subspace and corresponding cache subspace within a selected adjustment time, based on the adjusted requirement metadata and the execution metadata of the corresponding cache subspace;

after the selected adjustment time is reached, adjust the requirement metadata of other cache subspaces based on the configuration request of the cache adjustment policy option; and restore operations of all storage units of the storage subspace and all cache units in the cache subspace corresponding to the storage subspace.

5. The SSD device accelerated by dynamic capacity cache of claim 2, wherein the SSD device is further configured to:

read the metadata of the storage unit, if there is a corresponding cache unit, then select the cache unit and update the structured data for cache states of the cache unit, and update the execution metadata and the structured data for search cost of the cache subspace to which the cache unit belongs;

if no corresponding cache unit exists, read the requirement metadata and the execution metadata of the cache subspace to which the cache unit belongs, and calculate the search range, a search order, and a search end condition;

in the structured metadata for the cache units, within the search range, calculate search cost function for each candidate cache unit according to the search order and record them into the structured data for search cost of the cache subspace to which the cache unit belongs before reaching the search end condition;

select the cache unit with the minimum search cost function, and update the metadata of the storage unit, the metadata of the original storage unit corresponding to the cache unit, and the metadata of the cache unit; and use the structured data for search cost of the cache subspace, to which the cache unit belongs, to set a total capacity of the corresponding one of the cache subspaces for at least one storage subspace.

6. The SSD device accelerated by dynamic capacity cache of claim 2, wherein the SSD device is further configured to:

read the requirement metadata and the execution metadata of the cache subspace to which the cache unit belongs, and calculate the search range, a search order, and a search end condition;

in the structured metadata for the cache units, within the search range, calculate search cost function for each candidate cache unit according to the search order and record them into the structured data for search cost of the cache subspace to which the cache unit belongs before reaching the search end condition;

select the cache unit with the minimum search cost function, and update the metadata of original storage unit corresponding to the cache unit, and the metadata of the cache unit; and use the structured data for search cost of the cache subspace, to which the cache unit belongs, to set a total capacity of the corresponding one of the cache subspaces for at least one storage subspace.

7. The SSD device accelerated by dynamic capacity cache of claim 2, further comprising:

a cache configuration interface configured to receive the external cache configuration request comprising a cache capacity and a cache adjustment policy option;

an external read/write interface configured to respond to external read/write requests, read out all or part of the content of the corresponding storage unit, or write all or part of the content received by the external read/write interface into the corresponding storage unit; and an internal read/write interface configured to implement read and write between the cache units and the storage units.

8. The SSD device accelerated by dynamic capacity cache of claim 7, wherein the SSD device is further configured to:

search for and select a cache unit for the specified storage unit in an external read request;

if the structured data for cache states of the cache unit indicates inconsistency between its content and that of the storage unit, then hand over the cache unit to the internal read/write interface, sequentially read out the content of the storage unit and write it into the cache unit, and update the structured data for cache states of the cache unit and the execution metadata of the cache subspace to which it belongs; and deliver specified part or all of the content in the external read request to the external read/write interface.

9. The SSD device accelerated by dynamic capacity cache of claim 7, wherein the SSD device is further configured to:

search for and select a cache unit for the specified storage unit in an external write request;

if the external write request writes only part of the storage unit, then based on the structured data for cache states of the cache unit, determine whether or not to hand over the cache unit to the internal read/write interface, sequentially read out the content of the storage unit and write it into the cache unit, and update the structured data for cache states of the cache unit and the execution metadata of the cache subspace to which it belongs;

obtain some part of new content of the storage unit from the internal read/write interface, write it into the cache unit, and update the structured data for cache states of the cache unit and the execution metadata of the cache subspace to which it belongs; and deliver specified part or all of the content in the external write request to the external read/write interface.

10. The SSD device accelerated by dynamic capacity cache of claim 7, wherein the SSD device is further configured to:

traverse the structured metadata for the storage units, and search for a storage unit, wherein search criteria comprises: the storage unit does not have a corresponding cache unit;

for each found storage unit, based on the requirement metadata and the execution metadata of corresponding cache subspace of the storage unit, and based on the cache execution policy option of the cache subspace, determine to search for and select a cache unit for the storage unit; and hand over the cache unit to the internal read/write interface, sequentially read out the content of the storage unit and write it into the cache unit, and update the structured data for cache states of the cache unit and the execution metadata of the cache subspace to which it belongs.

11. The SSD device accelerated by dynamic capacity cache of claim 7, wherein the SSD device is further configured to:

traverse the structured metadata for the cache units, search for a cache unit, wherein search criteria comprises: the content of the cache unit is inconsistent with the content of its corresponding storage unit; and for each found cache unit, based on the requirement metadata and the execution metadata of the cache subspace to which the cache unit belongs, and based on the cache execution policy option of the cache subspace, determine to search and execute a) or b) for the storage unit, wherein:

a) hand over the first cache unit to the internal read/write interface, sequentially write it into the storage unit, and update the structured data for cache states of the cache unit and the execution metadata of the cache subspace to which it belongs; and after the internal read/write interface completes the writing, update the structured data for cache states of the cache unit and the execution metadata of the cache subspace to which it belongs;

b) search for and select a second cache unit for the cache unit;

write the content of the cache unit into the second cache unit, and update the structured data for cache states of the cache unit and the execution metadata of the cache subspace to which it belongs;

hand over the second cache unit to the internal read/write interface, sequentially write it into the storage unit, and update the structured data for cache states of the cache unit and the execution metadata of the cache subspace to which it belongs; and after the storage read/write interface completes the writing, update the structured data for cache states of the cache unit and the execution metadata of the cache subspace to which it belongs.

12. The SSD device accelerated by dynamic capacity cache of claim 7, wherein the SSD device is further configured to:

traverse the structured metadata for the cache units, search for a cache unit, wherein search criteria comprises: the location of the cache unit in the structured metadata for the cache units does not meet the requirement of the search range in the requirement metadata of the cache subspace;

for each found cache unit, based on the requirement metadata and the execution metadata of the cache subspace to which the cache unit belongs, and based on the cache execution policy option of the cache subspace, determine to search for and select a second cache unit for the storage unit;

write the content of the cache unit into the second cache unit, and update the structured data for cache states of the cache unit and the second cache unit and the execution metadata of the cache subspaces to which they belong; and update the metadata of the storage unit corresponding to the cache unit.

* * * * *